United States Patent
Trantham et al.

(10) Patent No.: US 9,761,268 B1
(45) Date of Patent: Sep. 12, 2017

(54) PRECOMPENSATION BASED ON NEARBY DATA

(71) Applicant: Seagate Technology LLC, Cupertino, CA (US)

(72) Inventors: Jon David Trantham, Chanhassen, MN (US); Rodney Blake, Savage, MN (US); William Radich, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 4 days.

(21) Appl. No.: 14/094,235

(22) Filed: Dec. 2, 2013

(51) Int. Cl.
  *G11B 20/14* (2006.01)
  *G11B 20/10* (2006.01)
  *G11B 5/09* (2006.01)

(52) U.S. Cl.
  CPC ........ *G11B 20/14* (2013.01); *G11B 20/10194* (2013.01); *G11B 20/10398* (2013.01); *G11B 5/09* (2013.01)

(58) Field of Classification Search
  CPC ........ G11B 20/10194; G11B 20/10398; G11B 5/09; G11B 5/02; G11B 20/14
  USPC .................................. 360/39, 40, 48, 51, 55
  See application file for complete search history.

(56) References Cited

U.S. PATENT DOCUMENTS

| | | | |
|---|---|---|---|
| 4,964,107 A | 10/1990 | Galbraith | |
| 6,337,778 B1 * | 1/2002 | Gagne | H03L 7/18 360/46 |
| 6,785,071 B2 | 8/2004 | Elliott | |
| 7,880,986 B1 | 2/2011 | Cheng | |
| 8,315,128 B1 * | 11/2012 | Wilson | G11B 5/02 369/13.02 |
| 8,358,478 B1 | 1/2013 | Cheng | |
| 2003/0189778 A1 * | 10/2003 | Elliott | G11B 20/10009 360/29 |
| 2008/0158720 A1 * | 7/2008 | Watson | G11B 5/00826 360/77.12 |
| 2010/0053787 A1 * | 3/2010 | Mathew | G11B 20/10194 360/29 |
| 2010/0053793 A1 * | 3/2010 | Mathew | G11B 20/10194 360/39 |
| 2010/0118433 A1 * | 5/2010 | Buch | B82Y 10/00 360/75 |
| 2012/0275278 A1 * | 11/2012 | Wilson | G11B 5/02 369/13.24 |
| 2013/0070362 A1 * | 3/2013 | Mathew | G11B 20/24 360/65 |
| 2013/0083419 A1 * | 4/2013 | Springberg | G11B 5/09 360/46 |
| 2013/0155826 A1 * | 6/2013 | Zhang | G11B 27/3063 369/30.25 |
| 2013/0182350 A1 * | 7/2013 | Kawabe | G11B 20/10222 360/51 |

* cited by examiner

*Primary Examiner* — Thomas Alunkal
(74) *Attorney, Agent, or Firm* — Cesari & Reed, LLP; Kirk A. Cesari; Logan Brown

(57) ABSTRACT

A circuit may be configured to precompensate the storage of data on a storage device. The magnitude and polarity of the precompensated time adjustment can be determined by looking up data patterns of storage regions in a table. A boundary can include storage regions of the device used to determine the precompensation.

6 Claims, 9 Drawing Sheets

PRECOMPENSATION BASED ON NEARBY DATA

SUMMARY

In certain embodiments, an apparatus may comprise a circuit configured to adjust a timing of a transition of a signal to store data to a selected data storage region of a data storage medium based on data patterns of other data storage regions.

In certain embodiments, a precompensation timing circuit may be configured to adjust a timing of a transition of a first signal to store data to a target storage region of a data storage medium based on data patterns of selected other data storage regions.

In certain embodiments, a method may comprise adjusting, via a precompensation timing circuit, a timing of a transition of a signal to store data to a target data storage region of a data storage medium based on data patterns of other data storage regions. Further, the method may comprise storing data to the data storage medium using precompensated transition timing.

DETAILED DESCRIPTION

Figure 1:
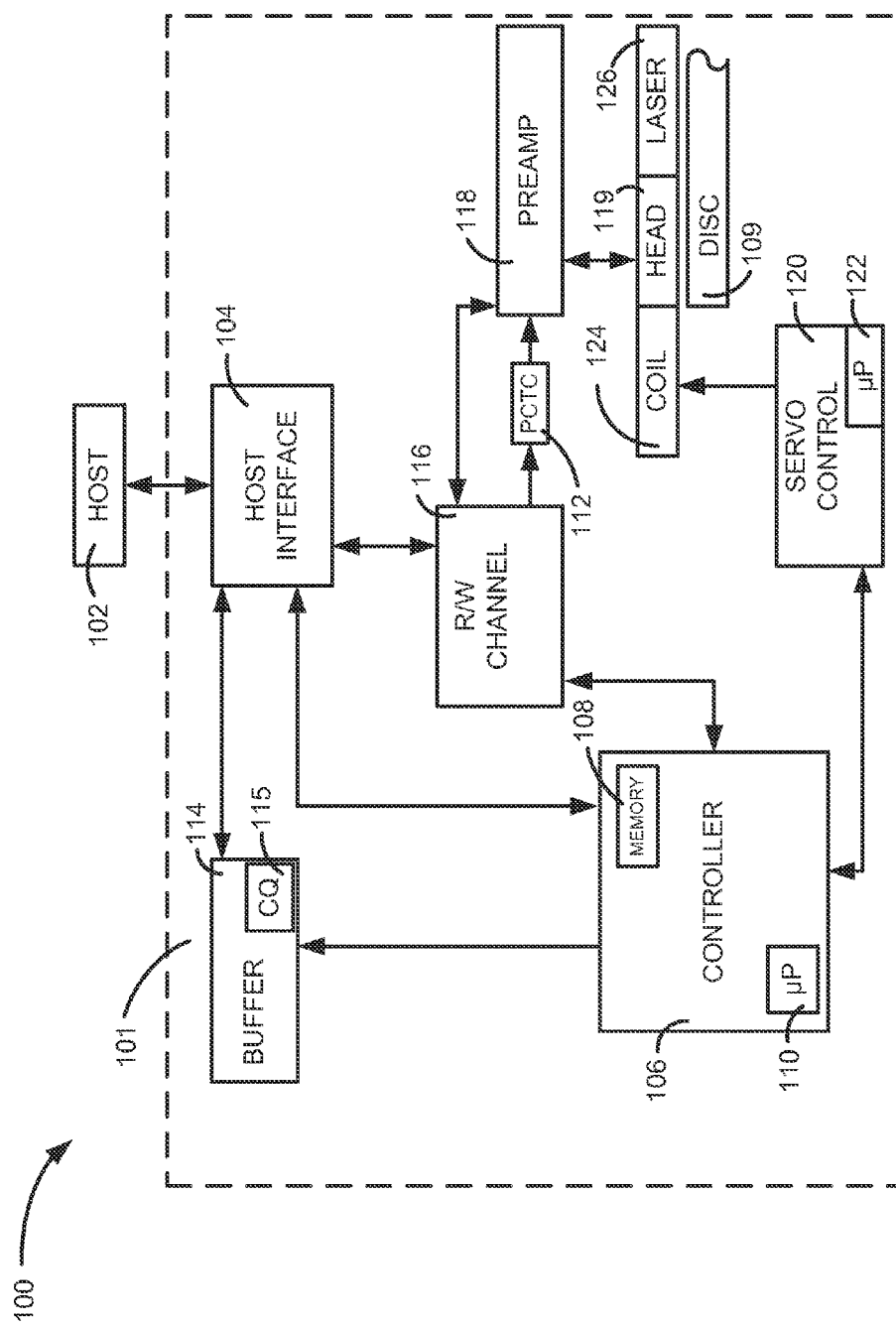
FIG. 1 is a system of precompensation based on nearby data, in accordance with certain embodiments of the present disclosure.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device including instructions that when executed cause a processor to perform the methods.

The present disclosure generally relates to data storage systems, such as disc memory. Specifically, the present disclosure precompensation based on nearby data.

Data can be stored in a region of a magnetic medium, such as a disc medium or a tape medium. In disc storage systems, data may be stored in regions called sectors. A track of data can include multiple sectors. Magnetic fields of a region can interact both with the magnetic fields from the region itself and from other regions. These interactions can cause non-linearities at the transition points of storage signals (e.g. the points where the signal changes from a low to a high or a high to a low value), which can affect the readback of the stored data by reducing areal density or degrading the bit error rate. Accurately sensing magnetic transitions can be important because the presence of a transition, or lack thereof, can be used to encode the data, and may also be used for timing recovery.

Precompensation can be a method of optimizing the signal to noise ratio of stored data, and can involve time-shifting magnetic transitions earlier or later based upon data patterns, electrical characteristics of the recording elements (which may include interconnections, or associated electronics), magnetic coupling of media grains, and so forth. For example, an uncompensated signal may have a magnetic transition at time t, while the same transition may occur at time t+/−n for a precompensated signal. The magnitude and polarity of the time shift, n, can be based on characteristics of the disc media (material, rotational speed, etc.), the recording head, the bit pattern of the current data track, the bit pattern of the neighboring regions, or any combination thereof. Precompensation can be applied to a signal, such as a write data signal or a laser control signal, via a controller, a read-write channel, a preamp, or other circuit.

FIG. 1 depicts a system with precompensation based on nearby data, generally designated 100. Specifically, the system 100 provides a functional block diagram of a data storage device (DSD). The DSD 101 can optionally connect to be removable from a host device 102, which can be a device or system having stored data, such as a desktop computer, a laptop computer, a server, a digital video recorder, a photocopier, a telephone, a music player, other electronic devices or systems not listed, or any combination thereof. The data storage device 101 can communicate with the host device 102 via the hardware/firmware based host interface circuit 104 that may include a connector (not shown) that allows the DSD 101 to be physically removed from the host 102.

The DSD 101 can include a programmable controller 106 with associated memory 108, and processor 110. The programmable controller 106 may be part of a system on chip (SOC). A buffer 114, which can be volatile or non-volatile memory (e.g. spin tunneling random access memory (ST_RAM), flash, etc.), may temporarily store user data during read and write operations and can include a command queue (CQ) 115. The command queue (CQ) 115 may be volatile or non-volatile memory, and can temporarily store multiple access operations pending execution. The (R/W) channel 116 can encode data during write operations and reconstruct user data during read operations. The preamplifier/driver circuit (preamp) 118 can apply write currents to the head(s) 119 and can provide pre-amplification of readback signals. A servo control circuit 120 may use servo data from a servo sector to provide the appropriate current to the voice coil motor 124 to position the head(s) 119 over disc(s) 109. The controller 106 can communicate with a processor 122 to move the head(s) 119 to the desired locations (e.g. tracks) on the disc(s) 109 during execution of various pending commands in the command queue 115 or during other operations. The channel configurations and systems described herein may be implemented in the R/W channel 116 as hardware circuits, software, memory, or any combination thereof.

Precompensation timing circuit(s) (PCTC) 112 can determine precompensation that may be applied to a write signal to store data to the disc 109 via the head 119 and the preamp 118. Precompensation can be a timing adjustment of a signal, such as the write signal, which may cause signal transitions to occur earlier or later. For example, an uncompensated signal may have a transition at time t, while the same transition may occur at time t+/−n for a precompensated signal. The value of the timing adjustment can be determined by looking up one or more data patterns from a neighborhood boundary in a table. In some cases, no timing adjustment may be applied. The table may be stored in registers, static random-access memory (SRAM), a non-volatile solid state memory, read-only memory (ROM), other types of memory, or can be included in the PCTC 112. Portions of the table may be paged into and out of memory depending upon the head 119 or the recording zone. The PCTC 112 may also precompensate a laser control signal 126 which may be generated by the R/W channel 116 or the preamp 118. The PCTC 112 may be part of an SOC, integrated into the controller 106, integrated into the R/W channel 116, integrated into the preamp 118, may be a separate circuit, include firmware or software, or any combination thereof.

Figure 2:
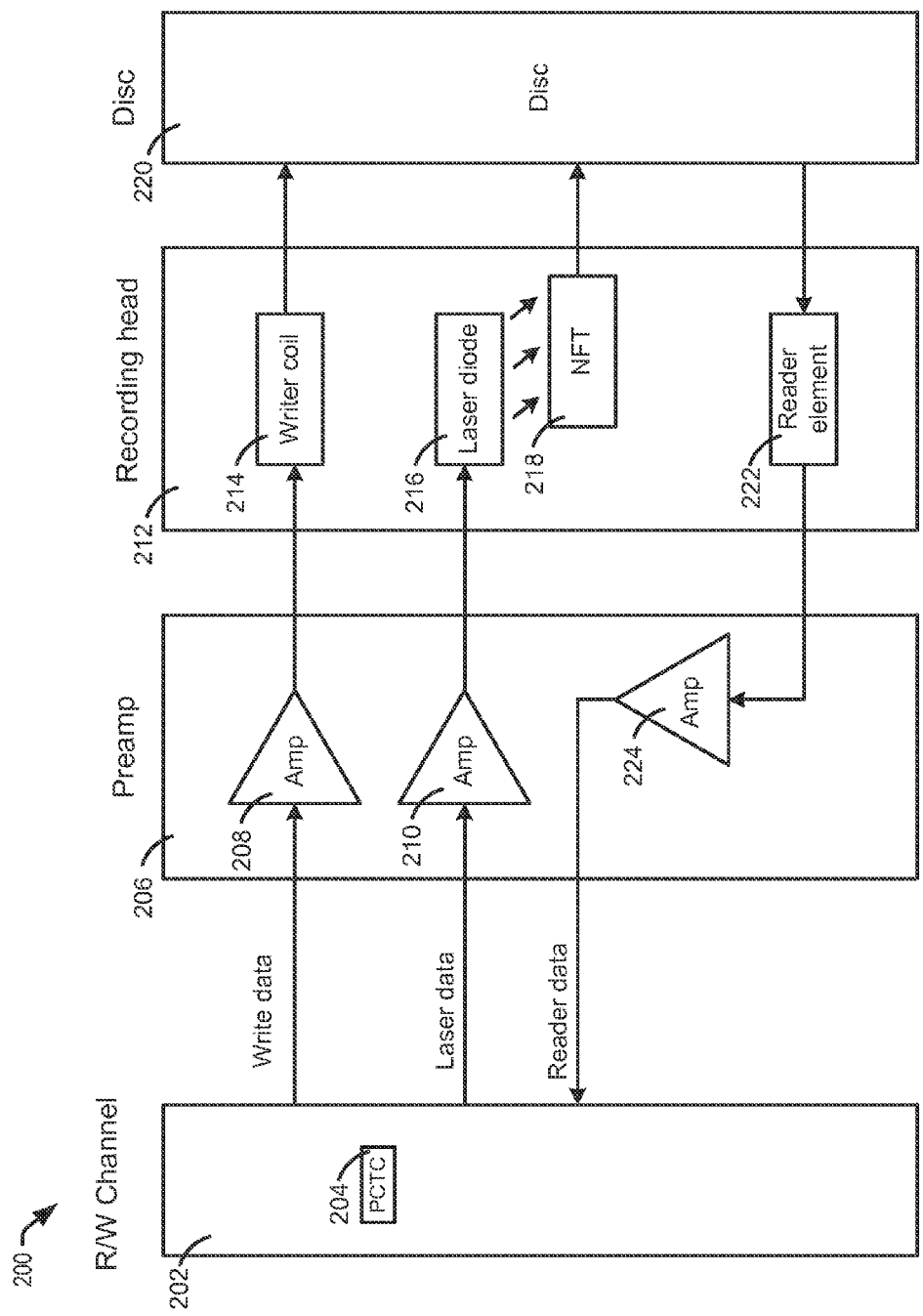
FIG. 2 is a system of precompensation based on nearby data, in accordance with certain embodiments of the present disclosure.

Referring to FIG. 2, a system of precompensation based on nearby data is shown and is generally designated 200. The R/W channel 202 may include a precompensation timing circuit (PCTC) 204 that can be integrated into other circuits, such as a controller or a microprocessor and may be implemented via firmware. The PCTC 204 can precompensate a laser control signal, a write data signal, or both, which may cause the transitions to occur earlier or later. For example, an uncompensated signal may have a transition at time t, while the same transition may occur at time t+/−n for a precompensated signal. The value of the timing adjustment can be determined by looking up one or more data patterns from a neighborhood boundary in a table. In some cases, no timing adjustment may be applied. The table may be stored in registers, SRAM, a non-volatile solid state memory, read-only memory (ROM), other types of memory, or can be included in the PCTC 204. The R/W channel 202 can transmit the write data to the preamp 206, where it can be conditioned (e.g. amplified, buffered, filtered, etc.) by a circuit 208. The write signal may then be sent to a recording head 212 where it may drive a writer coil 214 to program the disc 220. In some embodiments, the system 200 can include two or more recording heads 212, such as may be found in two dimensional magnetic recording (2D recording), and may also include two or more preamps 206. Some components, such as the R/W channel 202, the preamp 206, the recording head 212, the reading element 222, and other components may have multiple inputs and outputs.

The R/W channel 202 can generate a laser control signal and transmit it to a circuit 210 within the preamp 206. The circuit 210 can generate a laser data current that can drive a laser diode 216 which may transmit the laser light to a near field transducer which, in turn, can heat the disc 218 for HAMR recording. A reader element 222 can read data on the disc 220 and send a read data signal to a circuit 224 (e.g. an amplifier) on the preamp 206. The circuit 224 can condition the read data signal and send it to the R/W channel 202, where it may be sent to a controller, a microprocessor, a host, or other circuit for processing. In addition, the read data signal may be processed by the R/W channel 202, or by firmware located within the R/W channel 202 or in other places on the data storage device.

Figure 3:
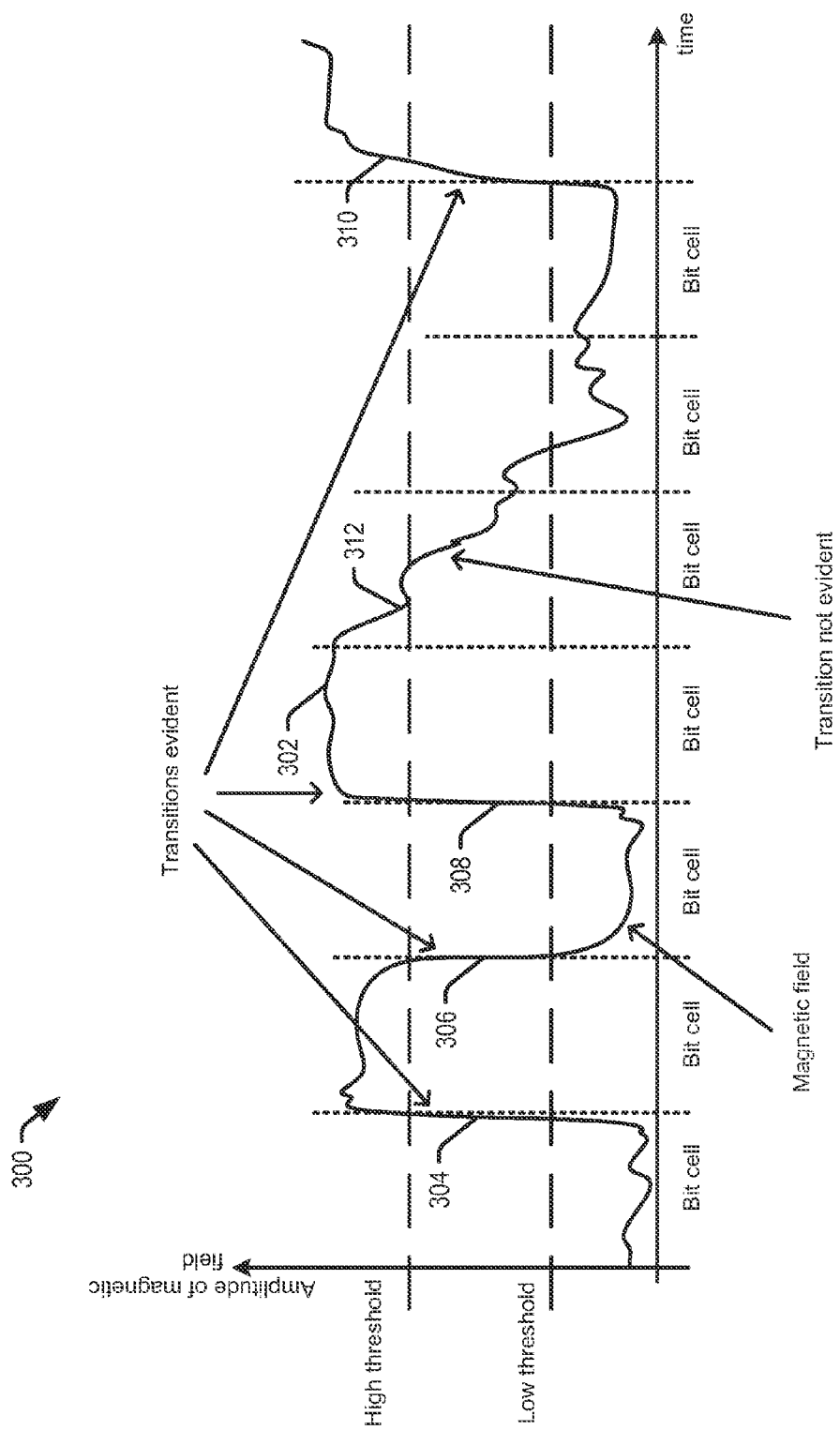
FIG. 3 is a diagram of an example write signal of precompensation based on nearby data, in accordance with certain embodiments of the present disclosure.

Referring to FIG. 3, a diagram of an example write signal is shown and is generally designated 300. The signal 300 can be a representation of the sensed amplitude (e.g. as read back by a reader element) of a magnetic field on a disc versus time. Bit cells can contain magnetic data patterns corresponding to the original logic highs and lows (ones and zeros) when written that may be used in digital circuits, and processed by software, firmware, and so forth. In some examples, data may be encoded by the presence of a transition (or lack thereof) within a bit cell window rather than the magnetized value of a cell. The magnetic field 302 can be recorded to a disc via a transducer on a recording head (see 119). A reader (e.g. a transducer on a recording head), may sense the actual magnetic field of the bit cells and convert the magnetic signal to a voltage. The stored data, however, may not be detected as discrete highs and lows, but instead may be recovered as a continuous signal. Electronic circuits (e.g. gain circuits, filters, equalizers, analog to digital converters, etc.), which may be located in R/W channels, preamps, and other circuits, or may be stand alone, can sample and convert the continuous voltage into digital values for further signal processing (e.g. by Viterbi symbol detection).

When transitions are evident (304, 306, 308, and 310), the circuits can detect the transition correctly and can properly decode the data. In some cases, such as when data from neighboring storage regions interfere with recording of data, a transition may not be evident 312, and the circuits may register an error which can lead to a loss of performance (which may be due to error recovery) or to an unrecoverable data loss.

Figure 4:
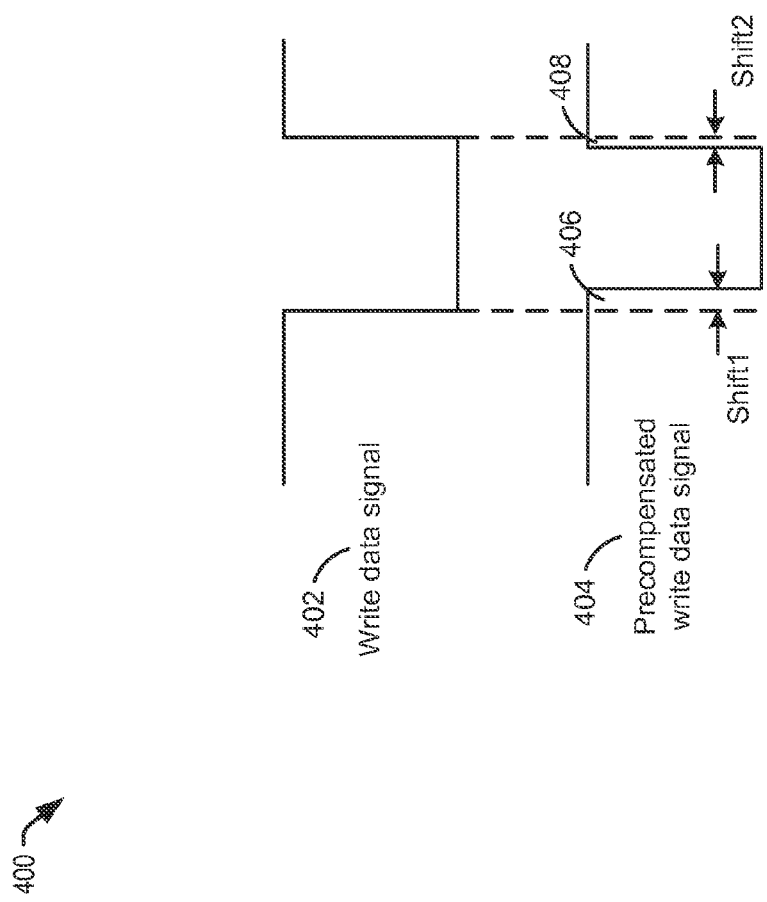
FIG. 4 is a timing diagram of precompensation based on nearby data, in accordance with certain embodiments of the present disclosure.

Referring to FIG. 4, a timing diagram of precompensation based on nearby data is shown and is generally designated 400. During precompensation, the transition timing of the signal can be changed. For example, when a write data signal (or other signal such as a laser control signal) 402 is precompensated, the timing of the rising and falling edge transitions (408 and 406, respectively) of the precompensated write data signal may be adjusted. In the example of timing diagram 400, the timing adjustment of the low to high transition 408, Shift2, is negative; the transition of the precompensated data signal 404 lags behind the associated transition of the write data signal 402. The timing adjustment of the high to low transition 406 is positive.

The magnitude and polarity of the timing adjustments can be determined by firmware, which may be located in a controller or R/W channel, microprocessors, and so forth, and may depend on neighboring bit patterns, the current bit pattern, electrical and magnetic characteristics of the recording head, electrical characteristics of the driving electronics, electrical characteristics of the interconnections, recording frequency, disc media characteristics including grain size, coercivity, or anisotropy In addition, the timing adjustments may be further determined by rotation velocity, recording zone and track, writer current, the spacing of the writer and readers from the media (including elements that affect these spacings), duration of the write, time from previous write operations, and so forth. Thermal, voltage, or process characteristics of components such as the controller, R/W channel, or preamp, may also affect the timing adjustments. Timing adjustments can be expressed in terms of fractions of a bit cell. For example, a timing adjustment may be equal to $\frac{1}{10}$ of a bit cell, or $-\frac{2}{16}$ of a bit cell.

A bit cell can have a period approximately inversely proportional to the linear velocity of the disc media under the recording head. The following equation shows the period, T, of a bit cell based on the recording frequency, f: T=1/f. In an example, when the recording frequency, f, is 2.4 GHz, the period of a bit cell can be 417 ps, and a timing adjustment of $\frac{1}{10}$ of a bit cell can be 41.7 ps. As recording frequencies change, bit cell periods and timing adjustments can change as well. Precompensation based on nearby data, however, be may be applied at any recording frequency, and the timing adjustments may be any positive or negative percent of a bit cell, including zero percent.

Figure 5:
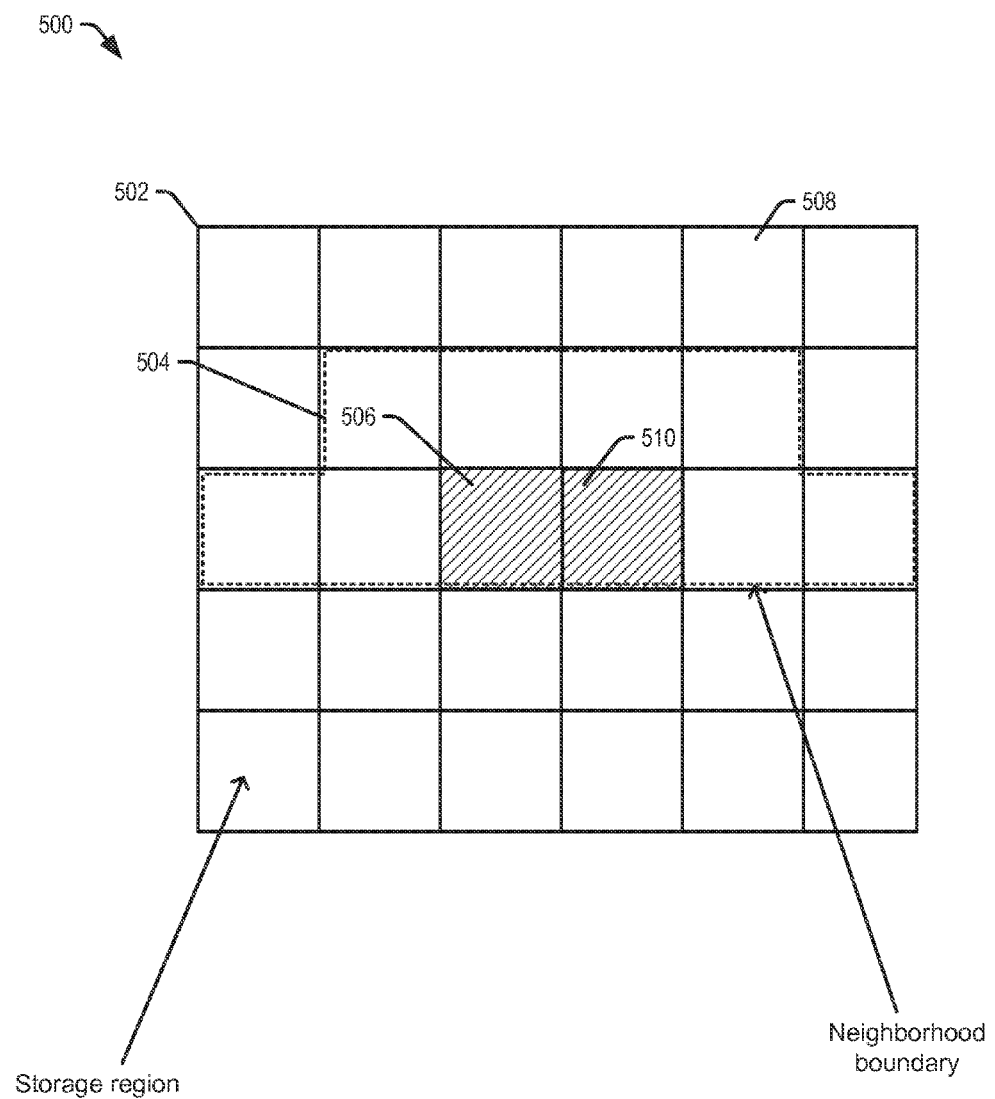
FIG. 5 is a system of precompensation based on nearby data, in accordance with certain embodiments of the present disclosure.

Referring to FIG. 5, a system of precompensation based on nearby data is shown and is generally designated 500. A magnetic storage medium 502, such as a disc, can include one or more bit storage regions 508. For example, the rows of 500 can be data tracks, and the columns of system 500 can be adjacent bit offsets. For ease of illustration, square bits with a bit aspect ratio of one are shown, but the techniques herein may be applicable to any bit aspect ratio.

When data is stored to target regions 506 and 510, the magnetic fields from neighboring storage regions 508 can affect the location of the effective transition point between the magnetic fields of the target regions. In some systems, the closer the neighboring storage region is located to the target region 506, the more interference can occur. In some examples, the interference may be affected not only by proximity, but by other factors such as the pattern of the magnetization on adjacent tracks, the pattern of bits already recorded or about to be recorded on the same track, bit orientation, size (frequency and track pitch), and order of writing.

A data storage device may precompensate the transition between target storage regions 506 and 510 based on the size, location, orientation, stored data, and other parameters of all of the storage regions 508 in the storage device. The parameters of the disc system (e.g. media grain size, media anisotropy, magnetic field strength, the height of the read sensor, and so forth) may also be factored into determining the precompensation values.

On some cases, it may be desirable to use less than all of the storage regions 508 of the data storage device to determine precompensation values. A neighborhood boundary can be used to select which storage regions 508 can be considered when determining a timing adjustment for a target regions 506 and 510. For example, the neighborhood boundary 504 of system 500 may include two storage regions 508 on either side of the target regions 506 and 510; in some embodiments, the neighborhood boundary may extend farther, upstream or downstream or into additional tracks. In other examples, the neighborhood boundary 504 can be different sizes and shapes, such as a two region by one region rectangle, an oval, etc., and may include other regions in other parts of the disc that may always be considered, irrespective of the target region 506. The parameters of the neighborhood boundary may be determined by firmware, hardware, or during the design or manufacturing process, and may be implemented by an R/W channel, a controller, a preamp, a recording head, a laser, etc. In some embodiments, the neighborhood boundary may be changed on the fly.

Figure 6:
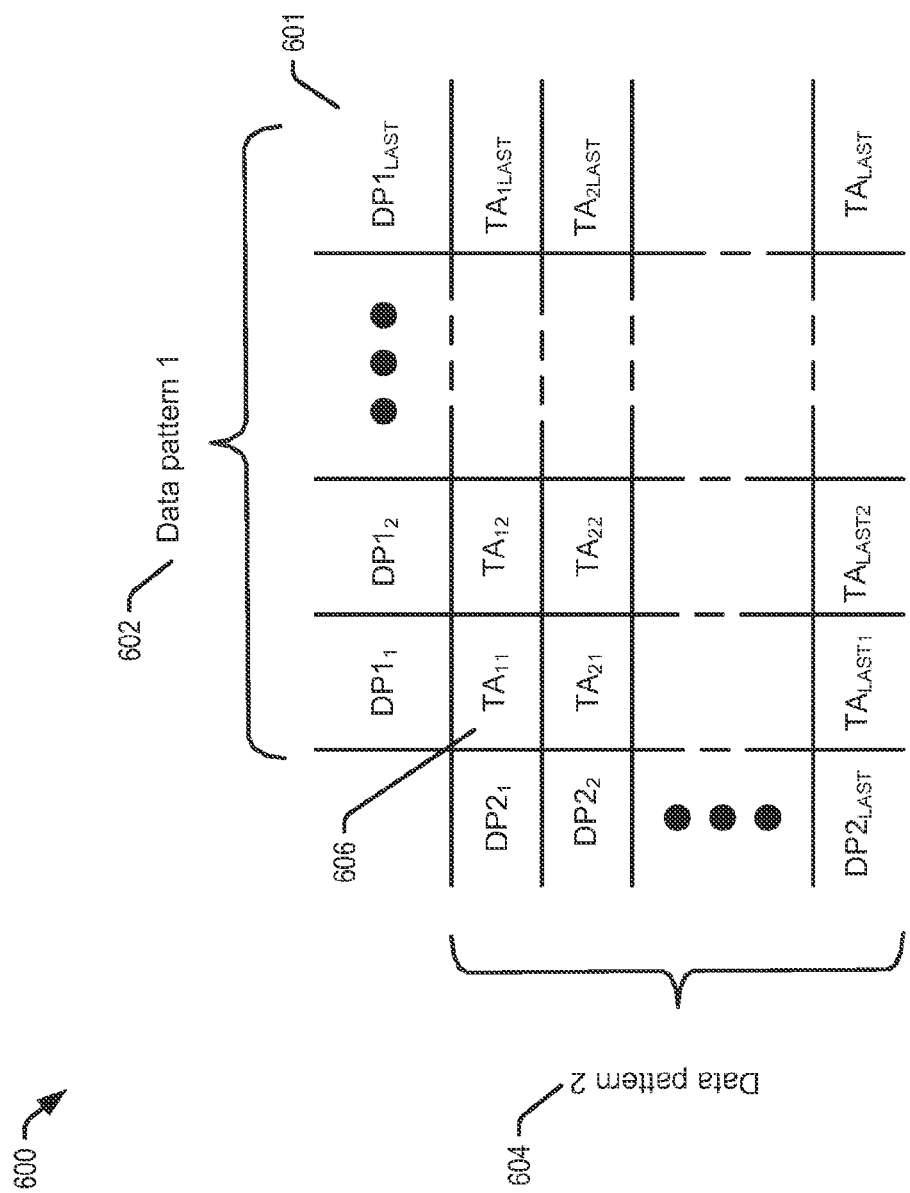
FIG. 6 is a table of precompensation based on nearby data, in accordance with certain embodiments of the present disclosure.

Referring to FIG. 6, a table of precompensation based on nearby data is shown and is generally designated 600. The table 600 can be an implementation of the systems 100 and 500. Precompensation adjustment values may be determined by design simulations, laboratory experiments, device characterizations, and so forth. A table can be generated and stored to a memory of a data storage device. Prior to storing data to a bit cell, firmware, software, an R/W channel, or other circuits (e.g. encoder, controller, preamp, microprocessor, etc.), can determine the precompensation value by looking up the bit pattern within a neighborhood boundary in a table, such as 600. For example, a neighborhood boundary may include bit cells that can be grouped into data patterns; data pattern 1 (DP1) 602 and data pattern 2 (DP2) 604. Note that when the bit cells within the neighborhood boundary can be grouped into two or more groups, the data storage device may use all, some, or none of them. Referring to table 601, when DP1 602 has a value of $DP1_1$ and DP2 604 has a value of $DP2_1$, the precompensation timing adjustment 606 can be $TA_{11}$. When a new bit cell is targeted, the value of DP1 602 and DP2 604 can change, and a new precompensation timing adjustment value can be retrieved from the table 601.

The value of bit cells in adjacent tracks or other locations of the disc may be stored in a volatile memory, such as a dynamic random-access memory (DRAM) buffer, or a non-volatile solid state memory, such as flash memory; when those values are not available, the storage device may read the bit cells from the disc prior to storing data. To minimize memory storage requirements, it may be desirable to store the data without encoding in DRAM and to only encode and convert the data to its actual media bit pattern while performing the pre-compensation adjustment. In some embodiments, bit cells that would otherwise be included in the neighborhood boundary can be ignored when their values are not in a memory or cannot be read from the disc. In some examples, the table 601 may not be accessed; for example when there is no magnetic transition, even though the recording head may be recording another bit cell.

As another example, consider the neighborhood boundary of system 500. The neighborhood boundary 504 can have multiple data groupings, including a four bit cell grouping, which may be located on a track of a disc, and a six bit cell grouping, which may be located on another track. In some embodiments, bit cells in a contiguous group on the same track as the target bit cell can be called a bit pattern. Data pattern 1 602 may be the four bit data pattern from the adjacent track, and data pattern 2 604 may be the bit pattern. The positions of data pattern 1 602 and data pattern 2 604 in the table 601 may be swapped; the structure of the table 601 may not be relevant.

Figure 7:
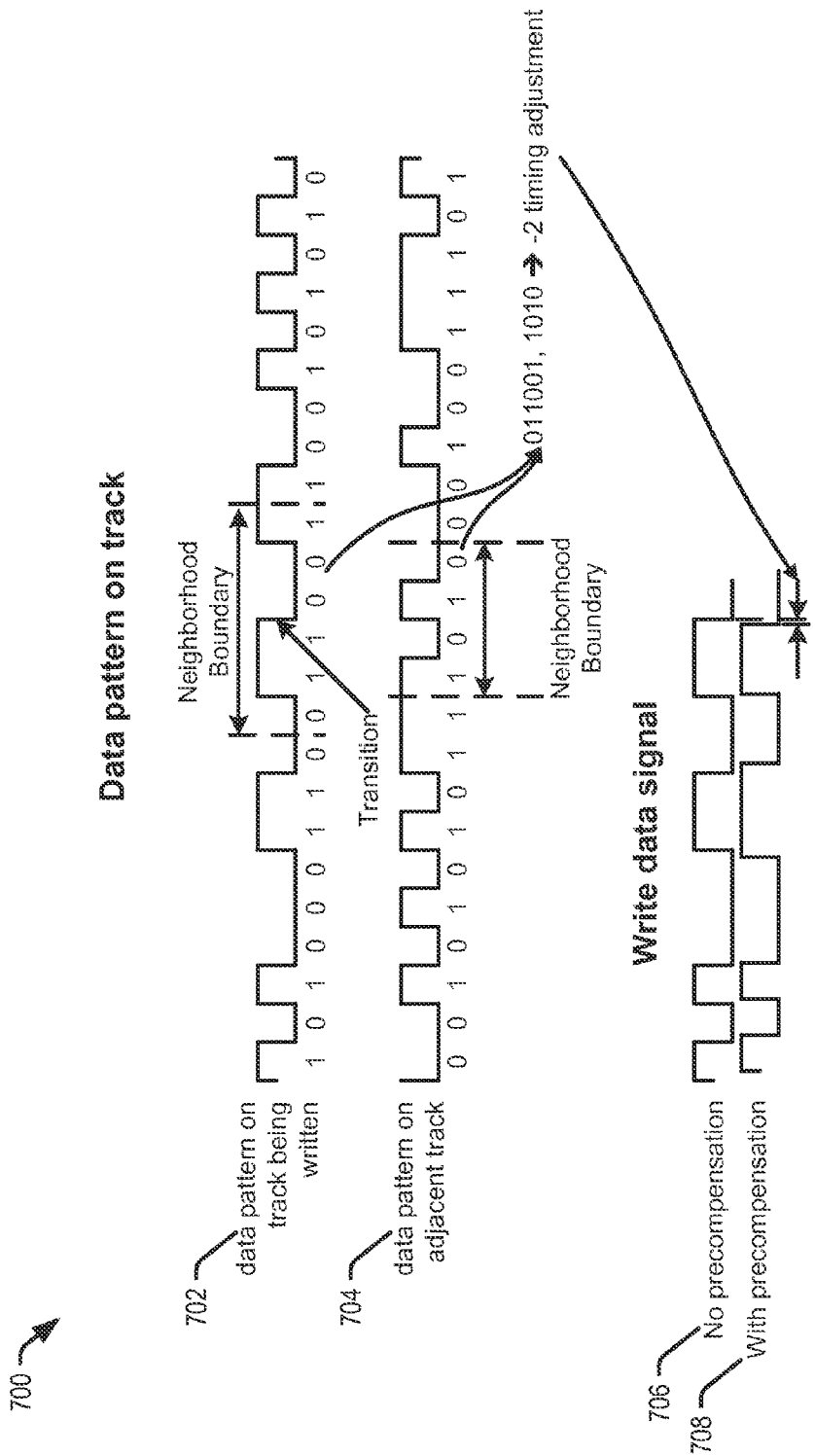
FIG. 7 is a diagram of an example bit pattern of precompensation based on nearby data, in accordance with certain embodiments of the present disclosure.

Referring to FIG. 7, a diagram of an example bit pattern of precompensation based on nearby data is shown and is generally designated 700. The bit pattern 700 can be an implementation of the systems 100 and 500, and the table 600. In the embodiment of 700, the neighborhood boundary can have a contiguous six bit cell grouping, including the target bit, and may have a contiguous four bit cell grouping on an adjacent track, which may be an up-track or down-track. The data pattern on the track being written 702, as well as the adjacent track 704, can include bit cell values outside the neighborhood boundary. When the recording head moves along the track being written 702, the neighborhood boundary can move with it, which may result in some bit cells included in the boundary and other bit cells no longer included. In some examples, the recording head may move, not just bit by bit down a track, but several bits at a time, or from track to track.

In the example of 700, the data pattern within the neighborhood boundary of the track being written 702 is 011001 and the data pattern within the neighborhood boundary of the adjacent track 704 is 1010. Firmware (or a controller, a R/W channel, etc.) can search for the data patterns in a table, which can be in a memory of the data storage device, to determine the precompensation timing adjustment, which, in this example, may be −2 (e.g. −2/8 of a bit cell, −2/11 of a bit cell, or other fraction of a bit cell). The R/W channel may precompensate the timing of the writer current to the recording head by this adjustment value. When a write data signal without precompensation 706 is compared to a write data signal with precompensation 708, the −2 timing adjustment can be seen.

Figure 8:
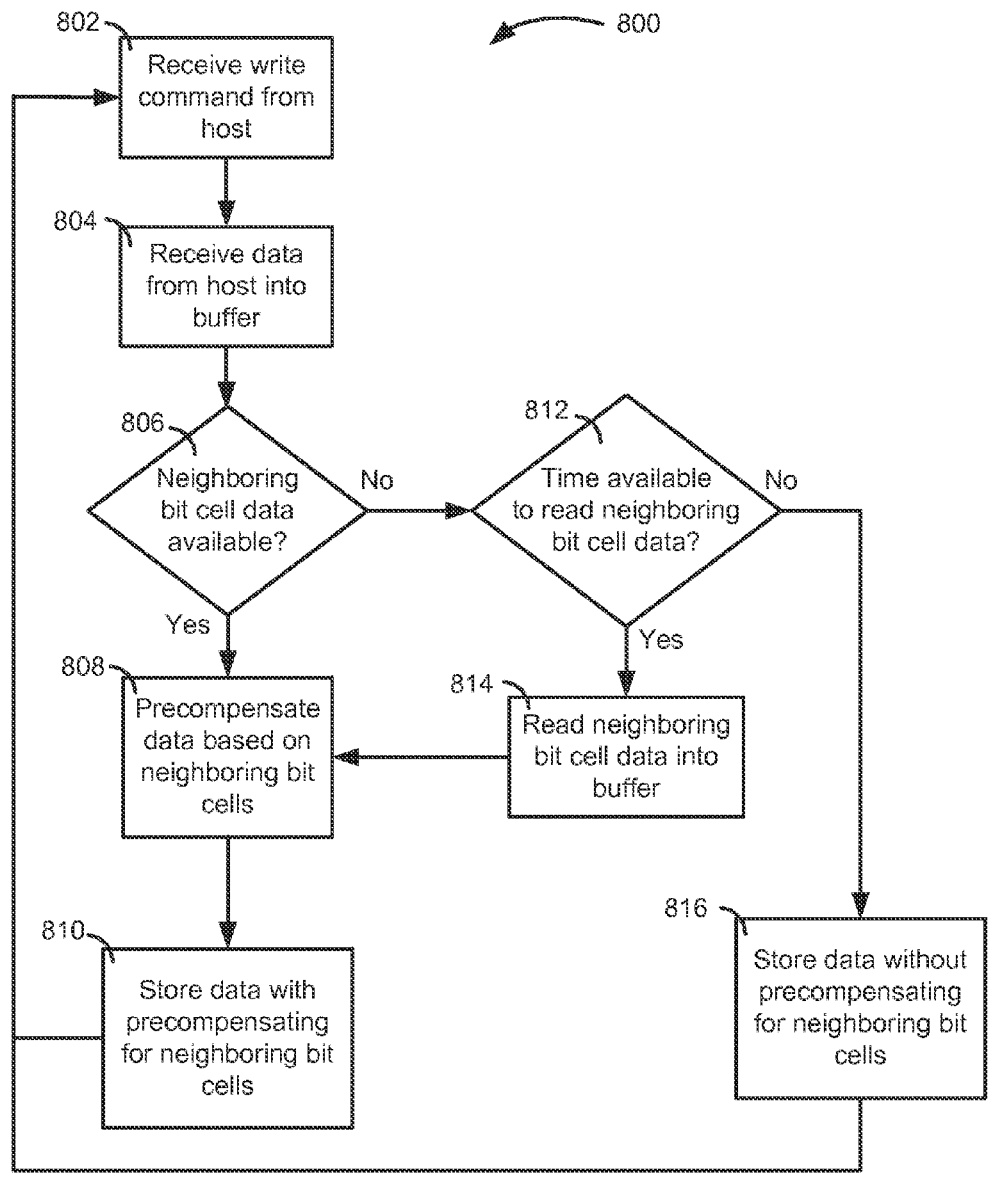
FIG. 8 is a flowchart of a method of precompensation based on nearby data, in accordance with certain embodiments of the present disclosure.

Referring to FIG. 8, a flowchart of a method of precompensation based on nearby data is shown and is generally designated 800. The method 800 can be an implementation of the system 500, the table 600, and the bit pattern 700, and can be an overview of a method of precompensation based on nearby data. The data storage device may receive write commands from a host, which may be through an interface such as a host interface, at 802, and can receive data for storage at 804.

The data storage device can determine if bit data within a neighborhood boundary is stored into a memory, such as a DRAM buffer, at 806. In some embodiments, it may be desirable to have more than just the data from the bit cells within the boundary stored into memory. For example, a disc may be configured to store some or all of the track data for every track within the boundary, or for a number of tracks past the boundary, or for individual bit cells located across the disc.

The bit data for the cells within the neighborhood boundary may be read from the memory by a circuit (e.g. encoder, R/W channel, controller, and so forth), and firmware can determine a precompensation timing delay from a table, which may be in volatile or non-volatile memory. When the cell data is available, a precompensation timing circuit (PCTC), which can be integrated into other circuits, such as a read-write channel, a controller, a microprocessor, or may be implemented via firmware, may precompensate the bit data at 808. The precompensated data may be stored to the disc at 810, and the process can repeat at 802.

When the values from the desired bit cells are not available from the memory, the data storage device can determine if there is time to read the bit cell data from the disc, at 812. In some situations, time may not be available to read some or all of the neighborhood bit cell data, in which case, the disc can store data with only a subset of data used for precompensation, or can store the data without any precompensation at 816. For example, the system may not have adjacent track(s) data available. In this case, it may precompensate using the data for the track being written. The process can repeat at 802. When the data storage device (via a controller, R/W channel, microprocessor, encoder, firmware, etc.) determines that time is available, at 812, it can read the data from the desired bit cells into a memory, at 814.

In examples where the data storage device includes two or more recording heads, such as may be found in two dimensional magnetic recording (2D recording), one or more of the recording heads can read the bit cell data from within neighborhood boundary into a memory at 814. The data may then be precompensated at 808, and stored to the disc at 810.

Figure 9:
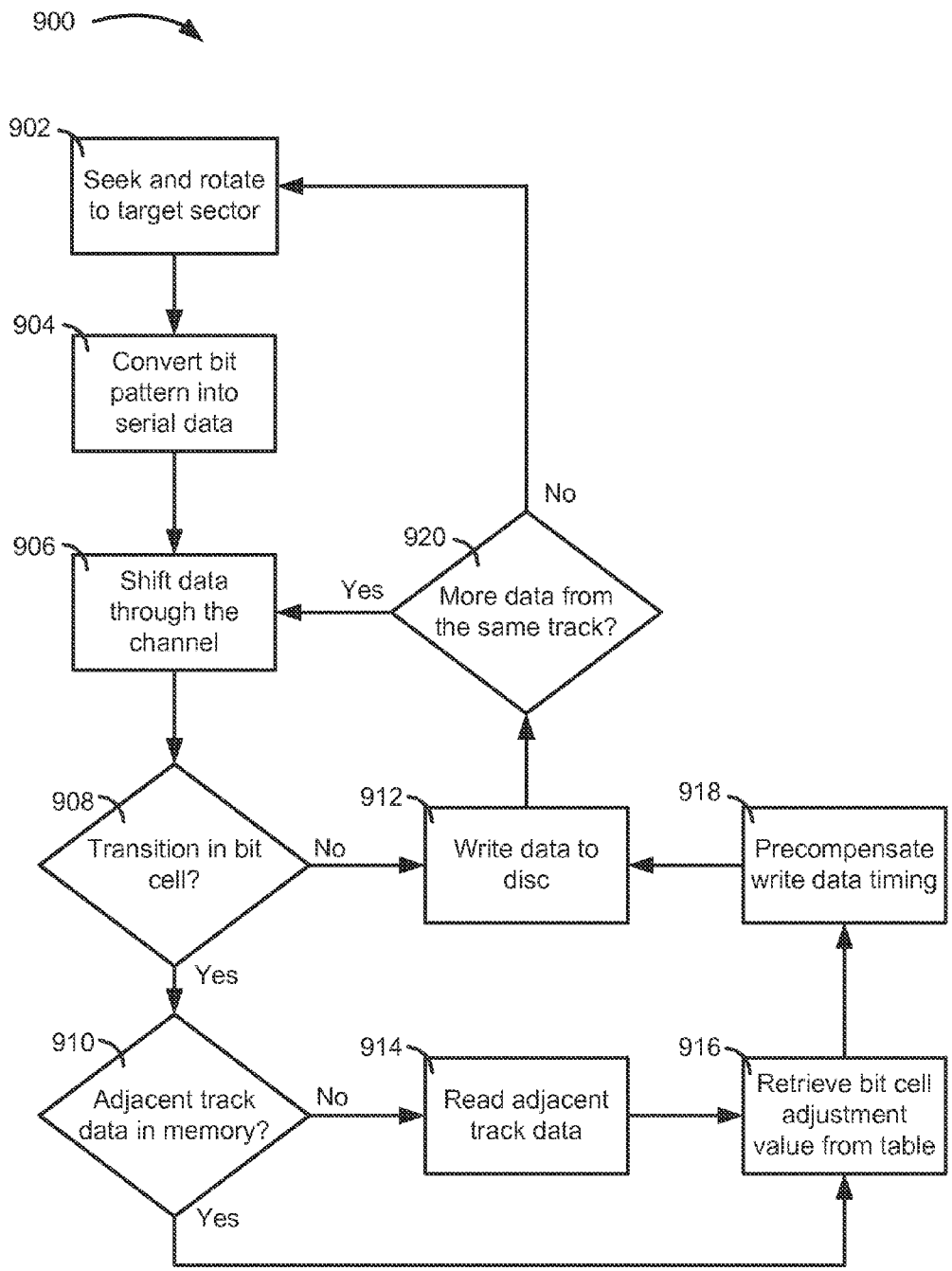
FIG. 9 is a flowchart of a method of precompensation based on nearby data, in accordance with certain embodiments of the present disclosure.

Referring to FIG. 9, a flowchart of a method of precompensation based on nearby data is shown and is generally designated 900. The method 900 can be an implementation of the system 500, the table 600, the bit pattern 700, and the method 800. In the example embodiment of 900, which can be a more detailed example than the method 800, the neighborhood boundary can include bit cells from a track being written and an adjacent track. Furthermore, while the method 900 may precompensate a write signal, other methods can precompensate the laser data signal.

When the data storage device receives a host command and host data, the recording head can seek the target sector, at 902. A R/W channel (or controller, microprocessor, R/W channel, interface, encoder, decoder, or firmware) can serialize the write data that may be stored in a memory, such as non-volatile solid state memory, at 904. The data may be shifted out of the R/W channel one bit at a time, at 906; in some embodiments, the data may be shifted more than one bit at a time.

Circuits can determine if a transition may occur at the target bit cell at 908. A transition may occur, within a bit cell or between bit cells, when stored data goes from a low to a high or a high to a low. When no transition occurs, the recording head may store data to the disc at 912. Precompensation affects timing transitions, so it may not be necessary for the disc to precompensate when the data values don't change. When there is a transition in a bit cell, at 908, the disc can determine if bit cell data for an adjacent track is stored in memory, at 910. When there is adjacent track data in memory, the data storage device can determine the bit cell adjustment by looking up the values for the data groups within the neighborhood boundary in a table, at 916. In some cases, some or all of the adjacent track data may not be in memory, and the storage device can read the adjacent track data via one or more heads, at 914 (provided there is enough time), and the disc can determine the bit cell adjustment, at 916.

When the precompensation timing adjustment is retrieved, at 916, the R/W channel can precompensate the write data signal, at 918, and the precompensated write signal may be stored to the disc at 912. The data storage device can determine if there is more serial write data targeted for the track, at 920, and when there is, another bit of data may be shifted out of the R/W channel to the recording head and stored to the next bit cell of the track. When there is no more serial data, at 920, the head can seek a new target sector, or a new target bit cell on the current track, at 902.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a circuit configured to:
adjust a timing of a transition of a first signal to store data to a selected data storage region of a selected track of a data storage medium based on data patterns of another track adjacent to the selected track;
the selected data storage region is a structure that stores one bit of data;
a first bit group including the selected data storage region and at least one bit from the another track; and
the circuit is further configured to adjust the timing based on a bit pattern value of the first bit group;
another bit group including at least one bit from the another track not included in the first bit group; and
the circuit is further configured to adjust the timing based on the bit pattern value of the first bit group and a bit pattern value of the another bit group;
the apparatus further comprising:
a table configured to store timing adjustment values based on a bit pattern of the first bit group and another bit pattern from the another bit group; and
the circuit is further configured to determine the timing from the table based on the bit pattern of the first bit group and a determined adjacent bit pattern; and
the circuit further configured to:
determine if the another bit pattern is stored in a memory;
when the another bit pattern is stored in a memory, adjust the timing; and
when the another bit pattern is not stored in the memory, read the another bit pattern from the data storage medium into the memory; and
when the another bit pattern is not in the memory, determine if a timer has expired;
when the timer has not expired, read the another bit pattern from the data storage medium into the memory and adjust the timing by the timing adjustment value; and
when the timer has expired, store data to the selected data storage region without adjusting the timing.

2. The apparatus of claim 1 comprising the circuit further configured to:
reconfigure the first bit group by removing a first set of storage regions and including another set of storage region.

3. The apparatus of claim 2 comprising the circuit further configured to:
reconfigure the another bit group by removing a first set of storage regions and including another set of storage regions.

4. The apparatus of claim 3 comprising the circuit further configured to:
read the another bit pattern from the data storage medium via two or more reader elements.

5. A method comprising:
adjusting, via a precompensation timing circuit (PCTC), a timing of a transition of a first signal to store data to a target data storage track of a data storage medium based on a data pattern that includes at least part of the target data track and part of an adjacent data track adjacent to the target data track;
storing data to the data storage medium using a precompensated transition timing based on the PCTC;
adjusting the timing based on a bit pattern value of the data pattern and another bit pattern value;
if the another bit pattern value is stored in a memory, then adjusting the timing,
else if a timer has expired, then storing data to the target data storage track without adjusting the timing; and
reconfiguring the data pattern by removing selected data regions of the adjacent data track and including other data regions.

6. The method of claim 5 further comprising:
when the timer has not expired:
reading data corresponding to the another bit pattern value from the data storage medium into the memory;
determining a timing adjustment value based on the data corresponding to the another bit pattern value and data corresponding to the bit pattern value; and
adjusting the timing based on the timing adjustment value.

* * * * *